United States Patent
Bhat

[19]

[11] Patent Number: 6,075,994
[45] Date of Patent: Jun. 13, 2000

[54] METHOD AND APPARATUS FOR DYNAMICALLY DETERMINING THE OPTIMAL COMMUNICATION MESSAGE BUNDLE SIZE FOR A COMMUNICATION SYSTEM

[75] Inventor: Kabekode V. Bhat, Naperville, Ill.

[73] Assignee: Lucent Technologies, Inc., Murray Hill, N.J.

[21] Appl. No.: 09/087,339

[22] Filed: May 29, 1998

[51] Int. Cl.[7] .................................................. H04B 1/100
[52] U.S. Cl. .......................... 455/458; 455/517; 455/528; 370/229; 370/230
[58] Field of Search ..................... 455/517, 528, 455/458; 370/229, 230, 231, 232, 420, 352

[56] References Cited

U.S. PATENT DOCUMENTS 4,866,707  3/1988  Marshall et al. ......................... 370/232
5,282,205  1/1994  Kuznicki ................................. 370/486
5,392,398  2/1995  Meyer ..................................... 395/200

*Primary Examiner*—Edward F. Urban
*Assistant Examiner*—Conguan Tran

[57] ABSTRACT

A method and an apparatus for dynamically determining the optimal communication mess age bundle size for a communications system based on system resource utilization parameters, such as CPU utilization, message processing latencies, and paging message response delays within the system. At low loads, a bundle size of 1 message is selected. Under such conditions, paging messages are broadcast to mobile units in real time, with no waiting. As the mobile station termination activity increases and the round-trip-paging response delay exceeds a threshold, the bundle size is increased to reduce the processing overheads, which, in turn, reduces the end-to-end system delay for paging. As the paging message traffic decreases, the bundle size is reduced to decrease the delay introduced by bundling, which, in turn, reduces the round-trip-paging response delay.

14 Claims, 1 Drawing Sheet

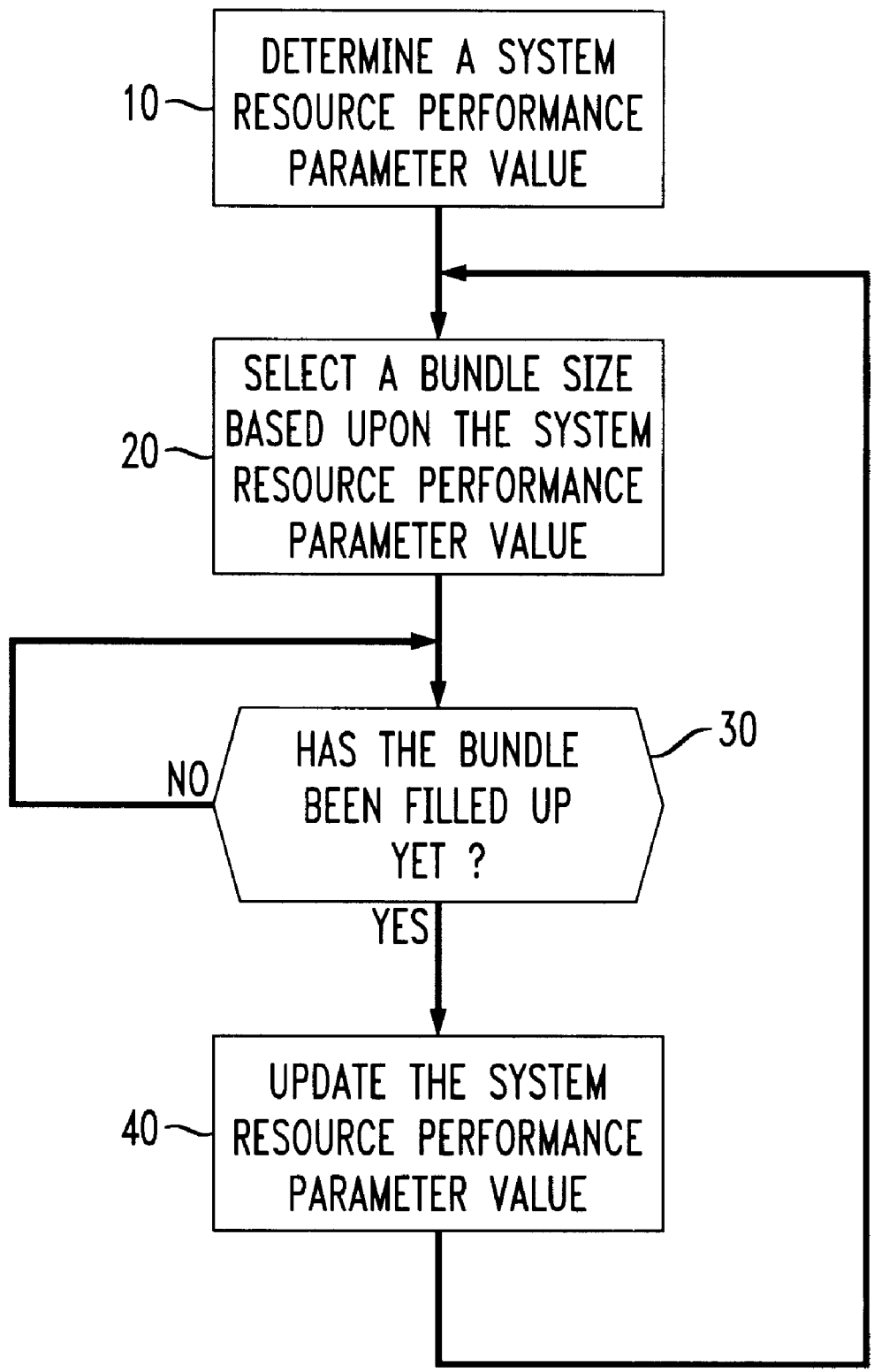

METHOD AND APPARATUS FOR DYNAMICALLY DETERMINING THE OPTIMAL COMMUNICATION MESSAGE BUNDLE SIZE FOR A COMMUNICATION SYSTEM

BACKGROUND OF THE INVENTION

1. Field of the Invention

The present invention relates to communication systems, and more particularly to dynamically determining the optimal communication message bundle size for a wireless communications system based on, paging message traffic, system resource utilization parameters, and paging message response delays within the system.

2. Statement of Related Art

Essential functions of a communication system, such as a network wireless system, include controlling, processing, and billing the calls completed by the system's customers. Maximizing the number of calls completed, while minimizing the system overheads, is an important competitive consideration for such a system. The KBHCA (thousands of busy hour call attempts) capacity of a system is a key indicator of the revenue potential of the system. The system must be reliable and take a minimal amount of time to set-up calls and hand-offs.

In a wireless communication system, there are two types of calls: mobile station originated calls and mobile station terminated calls. The mobile station terminated calls involve paging of possibly all cell sites, which, in turn, broadcast the messages to all mobile stations served by these cells. In order to establish a mobile-terminated call, a response to the paging message must be received from the mobile phone within a pre-determined time period. This time period is referred to as the round-trip paging response delay. Paging traffic depends on the system-wide mobile termination traffic. The other call control messages depend mostly on the nature and duration of a call. Paging unfortunately requires significant system resources throughout the system. An effective paging strategy reduces these overheads and therefore makes resources available for call control tasks so that more calls can be completed using a given network wireless communication system deploying various technologies such as TDMA, CDMA, GSM and AMPS.

The key to larger call control processing capacity for an application processor ("AP") is in reducing the paging overheads, such as message processing latencies and transmission delays. The bundling of paging messages reduces such paging overheads. Bundling combines a set of paging messages into a single larger message to take advantage of the reduction in CPU overheads that result compared to processing pages message-by-message. Bundling requires paging messages to be withheld for a period of time. During this delay period, the network resources for the mobile station to mobile station call gets delayed, which wastes network resources that could be used for other calls. In addition, quality of service deteriorates when call processing messages are unduly delayed.

As the bundle size is decreased, the processing delay for paging messages will decrease, however, the processing resource overhead per paging message will increase. As the bundle size increases, the bundling delay will increase, but the amount of system resources used for processing a particular number of pages will decrease.

Prior art bundling methods used in wireless communication systems typically wait for either a pre-determined period of time to elapse or for a pre-determined number of paging messages to be received before broadcasting those messages to the mobile units in the system.

As such, it is an object of this invention to dynamically select an optimal bundle size such that the system resources used and the delay introduced by the bundling messages together are both minimized.

SUMMARY OF THE INVENTION

This invention provides a method and an apparatus for dynamically determining the optimal communication message bundle size for a communications system based on system resource utilization parameters, such as CPU utilization, message processing latencies, and paging message response delays within the system. At low loads, this invention selects a bundle size of 1 message. Under such conditions, paging messages are broadcast to mobile units in real time, with no waiting. As the mobile station termination activity increases and the round-trip-paging response delay exceeds a threshold, this invention, increases the bundle size to reduce the processing overheads, which, in turn, reduces the end-to-end system delay for paging. The round-trip-paging response delay can exceed the threshold due to either undesirably high AP CPU utilization or due to inability of other system components to handle a particular volume of messages. As the paging message traffic decreases, this invention reduces the bundle size to decrease the delay introduced by bundling, which in turn reduces the round-trip-paging response delay.

BRIEF DESCRIPTION OF THE DRAWINGS

FIG. 1 is a flow chart depicting, at a high level of abstraction, the steps performed by this invention for dynamically determining the optimal communication message bundle size.

DETAILED DESCRIPTION OF THE PREFERRED EMBODIMENT

FIG. 1 is a flow chart depicting, at a high level of abstraction, the steps performed by this invention for dynamically determining the optimal communication message bundle size. First, as shown at 10, a system resource performance parameter is determined. In a wireless paging network, typical system resource performance parameters that could be used for determining a system resource performance parameter value include, but are necessarily limited to: the percentage of the capacity of one or more central processing units of one or more processors in the system, the latencies introduced by processing messages at various points within the system, and the delays introduced during transmission of messages.

After determining a system resource performance parameter value, a bundle size is selected, as shown at 20, based on the system resource performance parameter value. Factors considered in selecting an optimal bundle size include: minimizing the delay introduced by bundling. This is significant when the rate at which messages are to be transmitted is relatively low, compared to the system's message handling capacity. During such conditions, messages may not need to be bundled at all, or the bundle size will be relatively low, which will keep the delay introduced by bundling relatively low. Relatively small bundle sizes are acceptable for light message traffic loads because the processing and transmissions delays per message typically do not limit the system's message handling capacity at low message volumes. As message volume increases, however, processing and transmission delays per message become a significant factor in reducing a system's message handling capacity, so as the message volume increases beyond threshold, this invention will increase the bundle size to reduce the processing and transmission delays, which is achieved by processing and transmitting several messages together, rather than individually.

Bundling messages together is known in the prior art and is not depicted in FIG. 1. This invention goes beyond the prior art by selecting an optimal bundling size. Accordingly, this invention simply waits while messages are bundled elsewhere within the communication system, as depicted at 30.

Once the bundle has been filled up by bundling together the number of message selected as the current bundle size, this invention updates the system resource performance parameter value, as shown at 40. This updating of the system resource performance parameter value is performed by obtaining current information about the system resource parameter values used in originally determining a system resource performance parameter value, as shown at 10.

After updating the system resource performance parameter value, as shown at 40, a new bundle size is selected based upon the updated system resource performance parameter value, as shown at 20, and the functions depicted at 30, 40, and 20 are continually performed as shown in FIG. 1.

The preferred embodiment of this invention is presented below, implemented in pseudo-code. The pseudo-code models the processing scenario for a wireless communication network's workload. It will be obvious to those having ordinary skill in the art that the CPU utilization contribution of various software modules on an application processor ("AP") can be obtained by measuring and/or predicting values for the model parameters used below in the pseudo-code.

The preferred embodiment dynamically determines the optimal bundle size based upon the volume of paging message traffic, the message processing load on various system resource utilization parameters, and various paging message delays. For low message volumes, this invention selects a bundle size of 1 message. Under such conditions, paging messages are broadcast to mobile units in real time, with no waiting. Low message volumes will vary depending upon system resource capacities such as CPU processing capacities and/or a system's message handling capacity. Therefore, low message volumes is a relative term, which derives its meaning from the capacity of a particular system's resources. As the mobile station termination activity increases and the round-trip-paging response delay exceeds a threshold, the preferred embodiment, increases the bundle size to reduce the processing overheads, which, in turn, reduces the round-trip system delay for receiving paging acknowledgments. The round-trip-paging response delay can exceed the threshold due to either undesirably high AP CPU utilization or due to inability of other system components to handle a particular volume of messages. As the paging message traffic decreases, the preferred embodiment reduces the bundle size to decrease the delay introduced by bundling, which, in turn, reduces the round-trip-paging response delay.

For a particular wireless communication system, there is a time period within which paging must be done before an originating call will be dropped. A call being dropped is also referred to as the call being torn down. When the bundling interval exceeds this time period, or a certain percentage of this time period, the probability of dropping a call will increase. When this threshold is exceeded, the preferred embodiment throttles some paging messages to maximize the rate at which calls are completed.

The preferred embodiment of this invention could be implemented in software on an administrative AP (AAP) that maintains a data structure that has relevant performance information on each AP within the system. It will be obvious to persons having ordinary skill in the art that this invention could be implemented using any type of processor or any device containing such a processor.

The preferred embodiment receives a request vector (call_id, type, seq_number, paging interval) as an input, where call id identifies the originating call needing action. Request type can be a new page request, page response by a cell or mobile station, page drop or repeat page. Seq_number is the repetition index for the paging request which can be an integer in the set $\{1,2,3, \ldots \text{nrepeats}\}$. Paging interval is the duration between successive pages originated for the same call_id. All service times in a CPU (AP or Cell) are known entities and their values are available from a one time measurement in the laboratory. The following terminology is used here.

$U_p$: AP utilization as a fraction of CPU second. $(1-U_p)$ is the CPU idle time.

$S_p$: AP CPU service time for processing a paging message.

$S_{teardown}$: AP CPU service time for tearing down a call.

$S_{termination}$: AP CPU service time for processing a mobile terminated call.

$U_c$: Cell CPU utilization as a fraction of CPU second.

$S_c$: Cell CPU service time for processing a paging message.

$R_p$: AP CPU service time for processing a paging response.

$R_c$: Cell CPU service time for processing a paging response message.

paging_interval: Period by which a repeat paging is initiated if previous page had no response.

nrepeats: Maximum number of paging messages for a single mobile termination call.

bundle_size: Number of paging messages per bundle (initial value=1).

minslack. Minimum slack (as a fraction of AP CPU second) that must be idle to guarantee acceptable message delay at APs.

page_queue: A queue for batching up new and repeat paging requests.

length(page_queue). Number of paging requests in the page_queue.

seq_number: Repetition index; possible values: $\{1,2,3, \ldots \text{nrepeats}\}$.

tobepaged_list: A list of paging requests with associated {call_ids, sequence_number, type}.

limit: Time period beyond which paging response delay is unacceptable.

nactive_pages: Number of active page requests within the system initial value 0.

maxpages: Maximum number of pages per second (default 40–50) a cell can handle.

period: Time window during which paging rate is measured.

prate: Paging rate in number of pages per second.

mdelay: Miscellaneous delays in the transmission network.

$w_p$: Current batch interval (period used for bundling).

$T_r$: End-to-end (or round-trip) paging response delay. Note that paging_interval>$w_p$+$T_r$; otherwise, unnecessary duplicate paging will occur.

Trp: Value of $T_r$ used for previous bundle; initialized to a known value depending on technology The following pseudo-code depicts the preferred embodiment of this invention:

```
1.   /* Based upon the request type, current slack, and batch interval, select a bundle size that
2.   minimizes the delay and minimizes the slack */
3.   Algorithm ADAPT
4.     Procedure Wait () /*Wait for a new page, repeat page, page response, page drop, or
5.                         for page timer to expire */
6.       Do while(true)
7.         If there is a request then do begin
8.           If type = page_response or page_drop then do Update ();
9.           Else do begin
10.            If pagetimer then do Repeat_page();/* if there has been no response to a page
11.                                      before the page timer expires, then send a repeat page */
12.            Else do Dynabundle();
13.          End
14.        End
15.      End
16.    End
17.    Procedure Update()
18.      Remove the responded or dropped page requests from tobepaged_list and
19.      page_queue;
20.      nactive_pages = nactive_pages - 1;
21.      If page_drop then do begin/* Modify the AP utilization for the page drop */
22.        $U_p = U_p - S_p + S_{teardown}$;
23.        Do Call_teardown;/* Complete the call tear down processing */
24.      End
25.      Else do begin/* Modify AP utilization for page response */
26.        $U_p = U_p - S_p + S_{termination}$;
27.        Do Complete_mobile_termination_call_processing;
28.      End
29.    End
30.    Procedure repeat_page(call_id, seq_number)
31.      If (seq_number(call_id) < nrepeats) then do begin
32.        seq_number = seq_number + 1;
33.        Do dynabundle();
34.      End
35.      Else do begin
36.        type = page_drop;
37.        call wait();
38.      End
39.    End
40.    Procedure dynabundle()
41.      If length(page_queue) = maxpages then do begin
42.        reject (the request)/* Too many pages. So, shed the request*/;
43.        call Wait();
44.      End
45.      /* Else do Enqueue the request on page_queue */
46.      If the request is for new_page then do seq_number(call id) = 1;/* Process a new page
47.                                                                         request */
48.      Set timer(call_id, seq_number,interval);
49.      Include (call_id,seq_number) in page_queue, tobepaged_list;
50.      nactive_pages = nactive_pages + 1;
51.      If length(page_queue) = bundle_size then do begin
52.        empty pages from page_queue into a single message bundle and send it to cells;
53.        call pmeasures();/*Update all performance parameters */
54.        $T_r = w_p + \{S_p/(1-U_p-S_p)+ S_c/(1-U_c-S_c)+ R_p/(1-U_p-S_p)+ R_c/(1-U_c-S_c)+mdelay\}$
55.        /* Calculate the round-trip paging response delay by summing: (1) the average
56.           period of time that a paging message waits due to bundling of messages; (2) the
57.           latencies introduced by processing paging messages and responses at both the
58.           AP and at the cell and (3) the transmission delay */
59.        If (($T_r < T_{rp}$) and bundle_size > 1) then do bundle_size = bundle_size -1;
60.        /*If page response time < that of previous one reduce bundle size *
61.        Else If $T_r$ > limit then do bundle_size = bundle_size +1;/* If $T_t$ is too long,
62.        increase the bundle_size to reduce delay */
63.        $T_{rp} = T_r$;/* Save current round-trip delay as previous round-trip delay for next
64.        iteration */
65.        call wait()
66.      End
67.    End
68.    Procedure pmeasures()/* Obtain the latest performance data from the system */
69.      if clock() ≥ period then do begin /* the window for measuring the rate at which
70.                paging requests are being received has closed; so calculate the paging rate */
71.        prate = nactive_pages/ period;
72.        nactive_pages = 0;
73.        Set clock() = 0;
74.      End
75.      Do SAR()/* Gives measured numbers for AP utilization, cell utilization, mdelay*
76.      if bundle_size > 1 then do $w_p$ = 0.5*bundle_size/prate;/* set the average delay due
77.                         to bundling to half of the bundle size divided by the paging rate */
78.      Else do $w_p$ = 0;/* Set the average delay due to bundling to half the bundle size
79.                                      divided by the paging rate */
```

-continued

80. End
81. End of Adapt

Assuming that at time t0=0 seconds, a new paging request c1 arrives while limit=3.5 seconds, and period=10 seconds. Since this is a new paging request, procedure Dynabundle is called and seq_number (c1) is set to 1, page_queue has the entry {(c1,1)} and nactive_pages=1. Since length of the page_queue=bundle_size, (both are 1 at this time), the page is sent immediately to the cells. $W_p$ in this case is 0 and $T_r$ is assumed to be computed at 0.8 seconds. Procedure Wait is then called.

Assume that, at a different instant of time, the current bundle_size is 4, $T_{rp}$=1.5 seconds, nactive_pages=30, and prate=3. Assume that a new paging request c2 arrives after time 0.1 second. Paging request c2 will be placed into the page_queue upon entering procedure Dynabundle. Assume that the next 3 new paging requests, c3, c4, and c5, arrive at time t2=0.2 second, t3=0.3 second, and t4=0.4 second, respectively. Nactive_pages will get set to 4. Since length (page_queue)=bundle_size, pages in the page_queue are bundled and sent to the cells and procedure Pmeasures is called. Assume further that $T_r$ is computed to be 1.3 seconds. Since $T_r<T_{rp}$, bundle size is decremented to 3. $T_{rp}$ is set to 1.3, and procedure Wait is invoked next.

Assuming that period=10, a new call c5 enters at t5=0.5 second, increasing nactive_pages to 35, and that the next two calls arrive at t6=0.55 and t7=10, respectively. Prate then is calculated by dividing the number of active message by the time window during which the paging rate is measured, which yields: 37/10=3.7. Assume that Procedure Pmeasures computes the new $T_r$ to be 3.5 seconds. Assuming 3.5>limit, bundle_size gets decremented to 3. Then Procedure Wait is called.

The numbers presented here are for illustration purposes only and to keep the discussion simpler updating of the resource utilization parameters has not been presented. The scenario for handling page_drops, page_responses, repeat_pages, and the update scenario are not presented because they would be obvious to a person having ordinary skill in the art.

An alternate embodiment uses a table to chose the bundle_size. For a given system, based on a one time measurement or modeling and prediction, a table could be constructed that would give the optimal bundle_size to be used for paging at different paging traffic loads, for instance. The alternate embodiment would use a table, such as Table 1 to get the right bundle size based upon the volume of paging message requests received. Table-based approximations could also be implemented for other parameters such as batch interval, which could be used dynamically by the application.

TABLE 1

| Paging per second | Bundle_size used |
|---|---|
| 0–3 | 1 |
| 4–6 | 2 |
| 6–10 | 3 |
| 11–15 | 4 |
| 16–20 | 5 |
| 21–25 | 6 |

TABLE 1-continued

| Paging per second | Bundle_size used |
|---|---|
| 26–30 | 7 |
| 30–35 | 8 |
| 36–40 | 9 |

It will be obvious to those having ordinary skill in the art that alternate embodiments of this invention can be fruitfully employed in both communication and computer systems. In distributed computing systems where a number of processors are networked, throughput of each of the processors would be improved by use of this invention, which would also cause graceful degradation of response times within a range of acceptable values.

I claim:

1. A method for dynamically determining the optimal communication message bundle size for a communication system, said communication system being comprised of at least one processor and wherein communication messages are bundled together within said communication system, comprising, in combination, the steps of:

a. determining a value for at least one system resource performance parameter;
   b. selecting a number of communication messages which will complete a current bundle of one or more communication messages;
   c. after said number of communication messages which will complete a current bundle have been bundled together, updating said value for at least one system resource performance parameter based at least in part on a predetermined acceptable time period; and
   d. selecting a number of communication messages which will complete a next bundle of one or more communication messages, based at least in part upon said updated value for said at least one system resource performance parameter.

2. The method of claim 1 further comprising, in combination, the step of: updating said value for said at least one system resource performance parameter based at least in part upon the percentage of said at least one processor's processing capacity that is being used.

3. The method of claim 1 wherein the step of updating said value for said at least one system resource performance parameter based at least in part on said predetermined acceptable time period comprises the step of updating said value for said at least one system resource performance parameter based at least in part upon a pre-determined acceptable time period for receiving acknowledgment from said current bundle's destination that said current bundle was received at said current bundle's destination.

4. The method of claim 1 wherein the step of updating said value for said at least one system resource performance parameter based at least in part on said predetermined acceptable time period comprises the step of updating said value for said at least one system resource performance parameter based at least in part upon a pre-determined acceptable time period for receiving said current bundle at said current bundle's destination.

5. The method of claim 4 further comprising, in combination, the step of: selecting said pre-determined acceptable time period for receiving said current bundle at said current bundle's destination based at least in part upon a delay introduced by bundling said messages into said current bundle.

6. The method of claim 4 further comprising, in combination, the step of: selecting said pre-determined acceptable time period for receiving said current bundle at said current bundle's destination based at least in part upon a delay introduced during transmission of said messages.

7. The method of claim 4 further comprising, in combination, the step of: selecting said pre-determined acceptable time period for receiving said current bundle at said current bundle's destination based at least in part upon a delay introduced by processing said messages.

8. An apparatus for dynamically determining the optimal communication message bundle size for a communication system, said communication system being comprised of at least one processor and wherein communication messages are bundled together within said communication system, comprising, in combination:

a. means for determining a value for at least one system resource performance parameter;
   b. means for selecting a number of communication messages which will complete a current bundle of one or more communication messages;
   c. means for updating, based at least in part on a predetermined acceptable time period, said value for at least one system resource performance parameter after said number of communication messages which will complete a current bundle have been bundled together; and
   d. means for selecting a number of communication messages which will complete a next bundle of one or more communication messages, based at least in part upon said updated value for said at least one system resource performance parameter.

9. The apparatus of claim 8 further comprising, in combination: means for updating said value for said at least one system resource performance parameter based at least in part upon the percentage of said at least one processor's processing capacity that is being used.

10. The apparatus of claim 8 wherein said means for updating, based at least in part on said predetermined acceptable time period, said value for said at least one system resource performance parameter comprises means for updating said value for said at least one system resource parameter based at least in part upon a pre-determined acceptable time period for receiving acknowledgment from said current bundle's destination that said current bundle was received at said current bundle's destination.

11. The apparatus of claim 8 wherein said means for updating, based at least in part on said predetermined acceptable time period, said value for said at least one system resource performance parameter comprises means for updating said value for said at least one system resource performance parameter based at least in part upon a pre-determined acceptable time period for receiving said current bundle at said current bundle's destination.

12. The apparatus of claim 11 further comprising, in combination: means for selecting said pre-determined acceptable time period for receiving said current bundle at said current bundle's destination based at least in part upon a delay introduced. by bundling said messages into said current bundle.

13. The apparatus of claim 11 further comprising, in combination: means for selecting said pre-determined acceptable time period for receiving said current bundle at said current bundle's destination based at least in part upon a delay introduced during transmission of said messages.

14. The apparatus of claim 11 further comprising, in combination: means for selecting said pre-determined acceptable time period for receiving said current bundle at said current bundle's destination based at least in part upon a delay introduced by processing said messages.

* * * * *